Patented June 13, 1950

2,511,578

UNITED STATES PATENT OFFICE 2,511,578

ESTERS OF ANTHRACENE ACID ADDUCTS

Lyle M. Geiger, Edgewood, Pa., assignor to The Neville Company, Pittsburgh, Pa., a corporation of Pennsylvania No Drawing. Original application February 2, 1946, Serial No. 645,241. Divided and this application November 2, 1946, Serial No. 707,540

15 Claims. (Cl. 260—469)

This invention relates to esters of adducts formed by the reaction of anthracene and unsaturated organic acids, or acid anhydrides, and more especially to the plasticizing of organic polymeric materials, particularly synthetic resins, by such compounds, and this application is a division of my copending application Serial No. 645,241, filed February 2, 1946.

In addition this invention is concerned with, as new chemical compounds, esters of adducts of anthracene and alpha, beta unsaturated carboxylic acids.

Although certain new and useful compounds are provided by the invention, they are particularly adapted to the plasticizing of commercial plastics, and particularly the vinyl polymers and copolymers, especially polymers of vinyl chloride and its copolymers. A wide variety of plasticizers are, of course, known, and many of them have been used widely in the compounding of plastic compositions. A number of qualities are desirable in plasticizers such, for example, as compatibility, low volatility, stability, odorlessness, and non-toxicity, and it must be recognized that no single known plasticizer combines all of these desired properties although each may have certain advantages for a particular use. In addition, in many instances there are characteristic properties of a specific plasticizer or class of plasticizers which bring about specific desirable qualities in the plasticized composition. Thus, a particular polymeric material may be advantageously plasticized with a particular class of plasticizer. It is equally true that the known plasticizers are, as indicated, deficient in various ways for particular purposes, being, for example incompatible with other plasticizers or plastics, or not adapted to particular uses.

The vinyl plastics exemplify one aspect of this situation and they will therefore be referred to by way of example but not of limitation. Not only are they rather difficult to plasticize in general, but also up to the time of this invention it has not been practical to produce by the existing molding techniques rigid vinyl polymer articles similar in nature to those made from cellulose esters, such as the acetate, nitrate and acetobutyrate, or the cellulose ethers, such as ethyl and benzyl. This is due to the fact that at the molding temperature used, i. e., about 170° to 180° C., the vinyl polymers are thermally unstable. Attempts to overcome this difficulty by the addition of known plasticizers, in order to reduce the softening point of the vinyl polymers below the temperature at which they are unstable, have failed because the commonly used plasticizers (such as diakyl phthalates, dialkyl sebacates, dialkyl adipates, triaryl phosphates, Flexol 3-GO (triethylene glycol di-2-ethylhexoate) and Flexol 3-GH (triethylene glycol di-2-ethylbutyrate and other known types) inherently impart a high degree of elasticity, or rubberiness, to the vinyl polymer if they are present in amounts sufficient to confer safe molding temperatures. Moreover, the dimensional stability is likewise impaired. In other words, the addition of large quantities of the conventional plasticizers will lower considerably the molding temperature of vinyl polymers, but at the same time extremely flexible, rubber-like compositions result. Smaller quantities of the conventional plasticizers produce less rubbery compositions, but they do not lower the molding temperature sufficiently to prevent decomposition of the polymer.

Among the less desirable qualities of vinyl resins plasticized with the above named and other commonly used plasticizers is the exudation or bleeding of pasticizer from the plastic composition, causing loss of plasticizer with resultant reduced flexibility and elasticity. This characteristic is highly objectionable in articles of commerce since the plasticizer exuded may cause considerable damage to surfaces on which the articles may be placed, or come in contact, such as lacquered, varnished or painted protective coatings. This phenomenon, called syneresis, is thought to be caused by a contraction of the gel-like structure of plasticized macromolecular polymers resulting in the forcible ejection of oily plasticizer from the body of the plastic composition.

Further, it has been determined experimentally that the commonly used plasticizers, including those listed above, exhibit poor chemical resistance, particularly in respect to alkalis. It is well recognized by those skilled in the art that many synthetic organic polymers have outstanding resistance to chemical reagents, but that when plasticized with materials hitherto available for the purpose, particularly those esters listed above, the plastic composition obtained is considerably inferior in chemical resistance due to the relatively poor chemical inertness of the plasticizer component.

It is among the objects of the present invention to provide new anthracene derivatives that are particularly useful as plasticizers for polymeric materials, especially synthetic organic polymers, and particularly the vinyl polymers, and which are compatible therewith so that the natural appearance and the inherent chemical resistance of the polymeric material are not altered.

A special object is to provide anthracene derivatives that are especially suited for use in producing rigid vinyl polymer and copolymer products, particularly those of or including vinyl chloride, by molding procedures.

Still another object is to provide anthracene derivatives suited, among other uses, for plasticizing vinyl resins without any tendency for the plasticizing constituent to exude or bleed from the plastic composition, and also as plasticizers for use generally in lacquers, spirit varnishes, varnishes, enamels, paints and other coating compositions.

Other objects will appear from the following description.

I have discovered, and it is upon this that the invention is predicated in part, that esters of anthracene-carboxylic acid adducts are not only of general utility but also provide excellent plasticizers that permit the attainment of certain objects not heretofore possible or practicable. The terms "adduct" and "endo" as applied to anthracene derivatives herein, are used in the usual sense to designate those anthracene derivatives in which a substituent links the median carbon atoms, or is within the ring, or nucleus, of the anthracene molecule, i. e., is linked across the 9, 10 positions, and they are to be so understood in the following specifications and claims.

In the practice of the invention it is preferred for most purposes to form the anthracene adducts from unsaturated dibasic acids such, for example, as maleic, itaconic, and fumaric acids. The unsaturated acids are, however, generally utilizable in the practice of the invention, including not only the aliphatic unsaturated monobasic acids such as crotonic, angelic, acrylic and methacrylic acids, and the dibasic acids as just indicated, but also aromatic and other cyclic acids having an unsaturated carboxylic side chain, for instance cinnamic acid. Thus the acid adducts formed by reaction of anthracene with alpha, beta unsaturated mono- or dicarboxylic acids, described by Diels and Alder, Annalen 486, 191 (1931), are among the raw materials used in practicing this invention.

Similarly, the esters of such adducts may be formed by reaction with alcohols generally, i. e., whether primary, secondary, or tertiary, and whether saturated or unsaturated, examples being the various saturated alcohols derived from the alkanes, trimethylcarbinol (tertiary), isopropyl alcohol (secondary), and many others, typical examples being ethyl and normal propyl and butyl alcohols, secondary propyl and butyl alcohols, isobutyl alcohol, pentanol-2, pentanol-3, methyl isopropyl carbinol, tertiary amyl alcohol, the hexyl, heptyl and octyl alcohols, alcohols having a larger number of carbon atoms, derivatives and substituents of the foregoing and related alcohols, and mixtures of alcohols, either of different number of carbon atoms or of isomeric forms of those of the same number of carbon atoms.

The compounds provided by the invention may be formed also by direct reaction between anthracene and esters of alpha, beta unsaturated acids, if desired.

The esters of this invention are referred to hereinafter, in the light of what has been said above, as esters of a monohydric aliphatic alcohol containing more than one carbon atom and a Diels-Alder adduct of anthracene and an alpha, beta ethylenically unsaturated carboxylic acid.

I have found that for the purpose of producing plasticizers embodying the desirable properties that will be pointed out hereinafter it is not necessary to use chemically pure anthracene. For example, good yields of anthracene adducts having melting points indicating fairly pure products have been made by reacting maleic anhydride not only with anthracene of about 99 per cent purity, but also with what is known commercially as crude anthracene, which is a dark greenish-black, crystalline substance obtained by the cooling of commercial creosote oil, or with the so-called commercial 30-40 per cent anthracene, which is a dark orange crystalline substance that yields about 32 per cent of anthracene.

The adduct compounds may be made by heating anthracene and an alpha, beta unsaturated acid together. An inert solvent may be used, such as xylene or other aromatic compound, such as anisole. The resultant adduct is then esterified, yielding compounds provided by this invention. The esterification is performed easily and simply by heating the adduct and the alcohol, with an inert solvent if desired, in proportions to form the desired ester, and most suitably with a small amount, say from about 0.1 to 1 per cent, of an acidic catalyst, such as sulfuric, hydrochloric or paratoluene sulfonic acids. The excess of alcohol, if any, together with the water formed by the reaction are distilled off, and the ester may be purified by vacuum distillation. Generally speaking, these esters are of high molecular weight and have extremely low vapor pressures, even at elevated temperatures, so that it may be difficult to distill them satisfactorily under ordinary conditions of vacuum operation, but they can be distilled adequately by the application of molecular distillation, the principles and application of which are understood in the art.

In the production of the adducts, acid anhydrides may be used in place of the acids themselves, and in view of the relationship between organic acids and their anhydrides it is to be understood that the word "acid" as used hereinafter includes both acids and their anhydrides. The carboxylic group or groups of the unsaturated acids do not participate in the reaction.

An alternative way of preparing the esters, as mentioned before, is to react anthracene directly with the ester of the desired alpha, beta unsaturated acid. This may be desirable for some purposes because the ester is thus produced in a single step, which method is illustrated in the examples given below for the production of diethyl and dipropyl esters of Diels-Alder adduct of anthracene and fumaric or maleic acid.

*Diethyl ester.*—This exemplifies the direct production of the plasticizing ester from anthracene and an unsaturated alpha, beta ester. 20 gm. of purified anthracene and 19.3 gm. of diethyl maleate (1:1 mol ratio) were heated with 0.1 per cent of iodine at 100° to 170° C. for 5 hours. The product was then taken up in 40 cc. of acetone, and the solution was filtered to remove any unreacted anthracene. Part of the acetone was then evaporated under vacuum, whereupon the diethyl ester crystallized, giving a 71.3 per cent yield. The crystalline product was purified by refluxing it for 1 hour with 4.8 gm. of activated charcoal in 72 cc. of petroleum benzine. After filtration and cooling there was obtained a 56.5 per cent yield of colorless, crystalline ester melting at 105° to 106° C., soluble in toluol, acetone, xylol, n-butyl acetate, isophorone and methyl ethyl ketone; and soluble in hot n-butanol but less soluble in the cold.

*Dipropyl ester.*—This is a further example of the type of procedure used in making the diethyl ester. 20 gm. of purified anthracene and 22.5 gm. of n-propyl maleate (1:1 mol ratio) were reacted and treated substantially as in the foregoing example. The yield of the crude ester was 75.3 per cent. The purified ester was recovered as white, crystalline material melting at 100° to 101° C., and in a yield of 51.8 per cent, and the product had the same solubility characteristics as the diethyl ester.

In the process of preparing the esters embodied in this invention I may use the adduct of anthracene and maleic acid (or its anhydride) and esterify it with an alcohol. A wide variety of esters, all of which I believe to be new, have been prepared by this method, examples of which follow, using Diels-Alder adduct of anthracene and maleic anhydride and various primary alcohols.

*Dibutyl ester.*—308 gm. of crude anthracene maleic anhydride adduct and 223 gm. of n-butanol were heated with 13.7 gm. of p-toluene sulfonic acid for 6 hours at 115° to 135° C. Water was removed continuously by applying vacuum and bleeding air through the solution. The crude ester was taken up in 400 gm. of petroleum benzine, 28 gm. of activated charcoal were added, and the mixture was refluxed for ¾ hour. There were then added 20 gm. of powdered caustic soda while agitating the mixture. After filtration the solution was cooled and by filtration the dibutyl ester was recovered as white crystals melting at about 54° to 60° C. The yield was 42.5 per cent, and the product was soluble in carbon tetrachloride, chloroform, aromatic hydrocarbons, acetone, n-butanol, methanol, isophorone, n-butyl acetate, methyl ethyl ketone, and cyclohexane. Other properties are as follows:

| | |
|---|---|
| Melting point, °C. | 54°–60° |
| Color | Colorless |
| Form | Crystals |
| Specific gravity at 25° C. | 1.1153 |
| Ester value, per cent theory | 97 |
| Solubility: | |
|    Petroleum benzine | Sol. hot, insol. cold |
|    Heptane | Sol. hot, insol. cold |
|    Isopropanol | Sol. hot, less sol. cold |

*Di (2-ethylhexyl) ester.*—103.6 parts of anthracene maleic anhydride adduct melting at 258° C., and 146.4 parts of 2-ethylhexanol (1:3 mol ratio) were mixed with 5.2 parts of p-toluene sulfonic acid and heated during 2 hours at 135° C. The excess alcohol was distilled off at reduced pressure. The crude product was taken up in an equal volume of petroleum benzine, and it was then refluxed with powdered sodium hydroxide to neutralize it, after which it was refluxed with 10 per cent by weight of active charcoal, based upon the theoretical ester yield. The solvent was then recovered by vacuum distillation with 140° C. maximum liquid temperature. The total yield was 98.5 per cent of theoretical, and the product was soluble in carbon tetrachloride, chloroform, aromatic hydrocarbons, acetone, isopropanol, n-butanol, isophorone, n-butyl acetate, methyl ethyl ketone, heptane, petroleum benzine and cyclohexane. Other properties are as follows:

| | |
|---|---|
| Melting point, °C. | Below zero |
| Color | Pale Amber to colorless |
| Form | Resinous liquid |
| Specific gravity at 25° C. | 1.048 |
| Ester value, per cent theory | 95 |
| Solubility, methanol | Sol. hot, insol. cold |

*Esters of Diels-Alder adduct of anthracene and crotonic acid.*—The anthracene-crotonic acid adduct thought to have this structure:

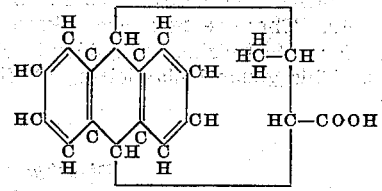

was prepared according to the method described by Diels and Alder, Annalen 486, 191–202, 1931. Esters of this adduct are easily prepared by the conventional methods of esterification already described above.

*Esters of anthracene—Itaconic acid adduct.*—11 parts of anthracene, 8 parts of itaconic acid, 50 parts of anisole, 0.04 part of iodine, and 0.04 part of hydroquinone were mixed and heated to reflux at 155°–160° C., with stirring, for 7 hours. On cooling and evaporation of the anisole, 15 parts of a tan-colored crystalline material were obtained which upon recrystallization from chlorobenzene yielded a white crystalline solid melting at 190 to 192° C., thought to be of the following structure:

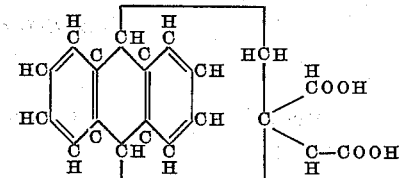

Esters of this adduct are easily prepared by the conventional methods of esterification as described above.

*Esters of anthracene—Fumaric acid adduct.*—Anthracene 9.9 parts and fumaric acid 6.4 parts together with 150 parts of anisole were heated to reflux at 150–155° C. for 9 hours with stirring. On cooling there was obtained 15 parts of product which was recrystallized from a mixture of 80 parts of chlorobenzene and 20 parts of methyl ethyl ketone, thereby yielding 11 parts of fine, white crystals whose melting point was 241 to 243° C.; the product was identified as trans form of Diels-Alder adduct of anthracene and 1,2-ethylene dicarboxylic acid.

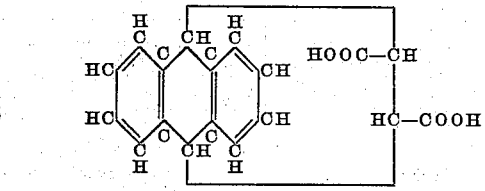

This product was reacted with n-butanol according to the method given under previous examples involving esterification, and there was obtained a white, crystalline product melting at 50 to 52° C. and which was presumably the trans form of the dibutyl ester of Diels-Alder adduct of anthracene and 1,2-ethylene dicarboxylic acid.

These esters are, to repeat, characterized by properties that render them particularly useful as plasticizers and compounding ingredients for a wide variety of polymers. Particularly, they are adapted to the plasticization of vinyl resins. This class of resins includes polymers and copolymers of such compounds as vinyl acetate, vinyl propionate, vinyl butyrate, vinyl chloride, vinyl benzene (styrene), and like materials. It also includes the products of reaction between polyvinyl acetate and aldehydes, known as polyvinyl formal, polyvinyl acetal, polyvinyl butyral, etc. These esters are likewise well adapted for plasticizing vinylidene chloride polymers. This general plasticizing ability may be exemplified by the data of the following tables which illustrate the compatibility of the foregoing esters, exemplified by the esters identified at the top of each table, with a large number of chemically unrelated plastics, determined by films cast on glass. The column headed "per cent resin solution" gives the concentration of the particular resinous material listed in the first two columns and the solvent used to dissolve it, the concentration being in weight percentage. The esters were dissolved in the solution to yield a final solids ratio of 1 part of the ester to 2 parts of the resin. Thus, highly useful lacquers are formed capable of many modifications, as is well known in the art.

TABLE I

*Di-ethyl ester of Diels-Alder adduct of anthracene and 1,2 ethylene dicarboxylic acid*

| Material | Chemical Nature | Per Cent Resin Solution | Compatible | Nature of Film | Sol'n |
|---|---|---|---|---|---|
| Lucite | Methyl Methacrylate | 20—in Toluol | Yes | Clear | Clear. |
| Ethyl Cellulose | Cellulose Ethyl Ether | 6—80 Toluol; 20 Acetone | Yes | ---do--- | Do. |
| Uformite [1] | Urea-formaldehyde condensate | 60—n-Butanol | Yes | ---do--- | Do. |
| Vinylite AYAF | Vinyl Acetate Polymer | 10—80 Xylol; 20 Isophorone | Yes | ---do--- | Do. |
| Nitrocotton | Cellulose Nitrate | 10—n-Butyl Acetate | Yes | ---do--- | Do. |
| Formvar | Polyvinylformal | 10—60 Toluol; 40 Isopropyl Alcohol | Yes | ---do--- | Do. |
| Melamine 586-9 [1] | Melamine-Formaldehyde condensate. | 50—n-Butanol | Yes | ---do--- | Do. |
| Polystyrene | Styrene Polymer | 10—Toluol | Yes | ---do--- | Do. |
| Hercose C | Cellulose Aceto-Butyrate Ester | 10—Methyl Ethyl Ketone | Yes | ---do--- | Do. |

[1] Ester did not dissolve in the Uformite and Melamine solutions until a little toluol was added. All films dried hard and clear except the Melamine and Uformite, which remained soft and clear with a slight tack.

TABLE II

*Di-propyl ester of Diels-Alder adduct of anthracene and 1,2 ethylene dicarboxylic acid*

| Material | Chemical Nature | Per Cent Resin Solution | Compatible | Nature of Film | Sol'n |
|---|---|---|---|---|---|
| Lucite | Methyl Methacrylate Polymer | 20—in Toluol | Yes | Clear | Clear. |
| Ethyl Cellulose | Cellulose Ethyl Ether | 6—80 Toluol; 20 Acetone | Yes | ---do--- | Do. |
| Uformite [1] | Urea-formaldehyde | 60—n-Butanol | Yes | ---do--- | Do. |
| Vinylite AYAF | Vinyl Acetate Polymer | 10—80 Xylol; 20 Isophorone | Yes | ---do--- | Do. |
| Nitrocotton | Cellulose Nitrate | 10—n-Butyl Acetate | Yes | ---do--- | Do. |
| Formvar | Polyvinylformal | 10—60 Toluol; 40 Isopropyl Alcohol | Yes | ---do--- | Do. |
| Melamine 586-9 [1] | Melamine-formaldehyde condensate. | 50—n-Butanol | Yes | ---do--- | Do. |
| Polystyrene | Styrene Polymer | 10—Toluol | Yes | ---do--- | Do. |
| Hercose C | Cellulose Aceto-Butyrate Ester | 10—Methyl Ethyl Ketone | Yes | ---do--- | Do. |

[1] Ester did not dissolve in the Uformite and Melamine solutions until a little toluol was added. All films dried hard and clear except the Melamine and Uformite, which remained soft and clear with a slight tack.

TABLE III

*Di-butyl ester of Diels-Alder adduct of anthracene and 1,2 ethylene dicarboxylic acid*

| Material | Chemical Nature | Percent Resin Solution | Compatible | Nature of Film | Sol'n. |
|---|---|---|---|---|---|
| Lucite | Methyl Metacrylate Polymer | 20—in Toluol | Yes | Clear | Clear. |
| Ethyl Cellulose | Cellulose Ethyl Ether | 6-80 Toluol; 20 Acetone | Yes | ---do--- | Do. |
| Uformite | Urea-formaldehyde condensate | 30—n-Butanol | Yes | ---do--- | Do. |
| Vinylite AYAF | Vinyl Acetate Polymer | 10—80 Xylol; 20 Isophorone | Yes | ---do--- | Do. |
| Nitrocotton | Cellulose Nitrate | 10—n-Butyl Acetate | Yes | ---do--- | Do. |
| Formvar | Polyvinylformal | 10—60 Toluol; 40 Isopropyl Alcohol | Yes | ---do--- | Do. |
| Geon 101 | Vinylchloride polymer | 5—91.5 Methyl Ethyl Ketone; 8.5 Cyclohexanone. | Yes | ---do--- | Do. |
| Geon 202 | Vinylchloride vinylidine chloride copolymer. | 8—90 Methyl Ethyl Ketone; 10 Cyclohexanone. | Yes | ---do--- | Do. |
| Melamine | Melamine-formaldehyde condensate. | 50—n-Butanol | Yes | ---do--- | Do. |
| Polystyrene | Styrene Polymer | 10—Toluol | Yes | ---do--- | Do. |
| Hercose C | Cellulose Aceto-Butyrate Ester | 10—Methyl Ethyl Ketone | Yes | ---do--- | Do. |
| Cellulose Acetate | Cellulose Acetate | 5—Acetone | Yes | ---do--- | Do. |
| Vinylite VYHH | Vinyl Chloride-Vinyl Acetate Copolymer. | 10—50 Methyl Ethyl Ketone; 50 Xylene | Yes | ---do--- | Do. |

All films dried hard and clear except the Melamine and Uformite, which remained soft and clear with a slight tack.

TABLE IV

*Di (2-ethyl hexyl) ester of Diels-Alder adduct of Anthracene and 1,2 ethylene dicarboxylic acid*

| Material | Chemical Nature | Percent Resin Solution | Compatible | Nature of Film | Sol'n |
|---|---|---|---|---|---|
| Lucite | Methyl Methacrylate Polymer | 20—in Toluol | Yes | Clear | Clear. |
| Ethyl Cellulose | Cellulose Ethyl Ether | 6—80 Tuluol; 20 Acetone | Yes | do | Do. |
| Uformite | Urea-formaldehyde condensate | 60—n-Butanol | Yes | do | Do. |
| Vin lite AYAF | Vinyl Acetate Polymer | 10—80 Xylol; 20 Isophorone | Yes | do | Do. |
| Nitrocotton | Cellulose Nitrate | 10—n-Butyl Acetate | Yes | do | Do. |
| Formvar | Polyvinylformal | 10—60 Toluol; 40 Isopropyl Alcohol | Yes | do | Do. |
| Melamine 586-9 | Melamine-formaldehyde condensate | 50—n-Butanol | Yes | do | Do. |
| Polystyrene | Styrene Polymer | 10—Toluol | Yes | do | Do. |
| Hercose C | Cellulose Aceto-Butyrate Ester | 10—Methyl Ethyl Ketone | Yes | do | Do. |

All films dried hard and clear except the Melamine and the Uformite, which remained soft and clear with a slight tack.

As further showing the utility of these esters, in another series of experiments 3 parts by weight of vinyl resins were mixed with 2 parts of the dibutyl ester of Diels-Alder adduct of anthracene and 1,2 ethylene dicarboxylic acid, and the mixture was milled on a steam heated rubber mill at 150° C. The materials used and the characteristics of the products are given in Table V:

TABLE V

| Material | Chemical Nature | Color | Transparency | Compatible |
|---|---|---|---|---|
| Vinylite VYNW | Vinyl chloride-vinyl acetate copolymer | Light | Clear | Yes. |
| Vinylite VYNS | Vinyl Chloride-vinyl acetate copolymer | do | do | Yes. |
| Geon 101 | Vinyl Chloride Polymer | do | do | Yes. |
| Geon 202 | Vinyl Chloride Copolymer | do | do | Yes. |

Also the di (2-ethyl hexyl) ester of Diels-Alder adduct of anthracene and 1,2 ethylene dicarboxylic acid was milled in the same way as in the foregoing example, using the same relative proportions. Results are given in Table VI.

TABLE VI

| Material | Chemical Nature | Color | Transparency | Compatible |
|---|---|---|---|---|
| Vinylite VYNW | Vinyl Chloride-vinyl Acetate Copolymer | Light | Clear | Yes. |
| Vinylite VYNS | Vinyl Chloride-vinyl Acetate Copolymer | do | do | Yes. |
| Geon 101 | Vinyl Chloride Polymer | do | do | Yes. |
| Geon 202 | Vinyl Chloride Copolymer | do | do | Yes. |

The plasticized compositions listed in Tables V and VI were then subjected to heat and pressure in a hydraulic press with heated platens. Temperatures varied from 120° C. to 165° C. in various experiments and pressures were varied from 5 pounds per square inch to 12,000 pounds per square inch. There were obtained clear, highly transparent smooth sheets of rigid plastic. The sheets obtained using the di(2-ethyl hexyl) ester of Diels-Alder adduct of anthracene and 1,2 ethylene dicarboxylic acid were the more flexible. Each possessed a hard surface and were out of range of a test instrument known to those skilled in the art as a Durometer, type A.

Sheets of plastic were prepared from the same vinyl resins and Flexol 3-GO, a typical plasticizer, and also from the same vinyl resins and di(2-ethyl hexyl) phthalate, the same proportions and conditions being observed. In each case, elastic, rubbery, soft and even sticky, but non-rigid plastic sheets were obtained.

As pointed out above, it has not been practicable to produce rigid vinyl polymer articles by known molding techniques. I have found, and this is an important feature of the invention, that the esters described, for example the foregoing dibutyl and di(2-ethyl-hexyl) esters of Diels-Alder adduct of anthracene and 1,2 ethylene dicarboxylic acid, can be applied to that end. Thus, the addition of such esters to the vinyl polymers and copolymers lowers the molding temperatures sufficiently to permit the production of plastic articles without decomposition or producing dimensional instability, and the products are non-rubbery and are crystal clear, light colored and tough, and rigid at room temperature.

As further exemplifying the desirable nature of these esters in comparison with previously known plasticizers for vinyl polymers, a test was carried out comparing the action of the dibutyl ester of Diels-Alder adduct of anthracene and 1,2 ethylene dicarboxylic acid with di(2-ethyl hexyl) phthalate, sometimes called dioctyl phthalate, which is one of the commonly used commercial plasticizers. Films made of various blends of "Vinylite VYHH," a vinyl acetate-chloride copolymer, and each of the two plasticizers were cast and their hardnesses were determined by Wilkinson's pencil method as described in Gardner's "Physical and Chemical Examinations of Paints, Varnishes, Lacquers and Colors" (Washington, 1939) at page 113. The films were heated at 105° C., and the hardness was determined at various time intervals. The results are given in Table VII:

TABLE VII

| Plasticizer | Dibutyl ester of Diels-Alder adduct of anthracene and 1,2 ethylene dicarboxylic acid | | | | Di(2-Ethyl Hexyl) Phthalate | | |
|---|---|---|---|---|---|---|---|
| Blend No | I | II | III | IV | V | VI | VII |
| % Plasticizer | None | 25% | 30% | 35% | 25% | 30% | 35% |
| Hrs. at 105° C.: | | | | | | | |
| 17 | ---- | 4H | 4H | 4H | 3H | F | F |
| 33 | 6H | 4H | 4H | 4H | 4H | 5H | 4H |
| 79 | 6H | 4H | 4H | 4H | 7H | 7H | 6H |
| 102 | 7H | 5H | 4H | 4H | 7H | 7H | 6H |
| 125 | 7H | 5H | 4H | 4H | 6H | 6H | 5H |
| 145 | 7H | 5H | 5H | 4H | 5H | 5H | 5H |
| 261 | 7H | 5H | 5H | 4H | 5H | 5H | 5H |
| 283 | 8H | 7H | 5H | 4H | 7H | 8H | 8H |
| Change | 2 | 3 | 1 | 0 | 4 | 10 | 10 |

From the foregoing table it appears clearly that although the softening action of the dibutyl ester of this invention on "Vinylite VYHH" is slightly less than that of the phthalate plasticizer, the former is considerably more stable to heat and is retained much better in the exposed film. As a matter of fact, the esters provided by this invention are characterized by extremely low volatility and therefor plastic compositions containing them are rendered much more permanent than is the case with ordinary commercial plasticizers.

A further advantage of these anthracene adduct esters is that they are compatible with all ester types of plasticizers and may therefore be used in mixture with them. Such mixtures may be applied, for example, to confer greater elasticity and rubberiness than is obtained with the adduct ester alone while at the same time providing plasticized compositions that are more stable to heat and more permanent than similar compositions not containing the adduct ester. Various results may be had in this way. Thus by using the esters of this invention in combination with phthalate plasticizers one obtains the advantages of both, and the former may act, according to physico-chemical principles, to reduce the volatility of the latter, thus improving the stability of the products.

The esters of this invention are generally characterized by being odorless, tasteless, colorless and stable to heat and light. They do not render plastic compositions tacky, and synthetic organic resins compounded with them show excellent adhesion and cohesion. These combinations of properties render the adduct esters of this invention unusually desirable for plasticizing purposes, as will be realized.

The suitability of the compounds described for the special purposes of plasticizing depends, at least for many purposes upon complete compatibility between the plasticizer and the synthetic resin. This characteristic of compatibility may vary according to the acid from which the adduct is formed and also upon the alcohol used in forming the esters of this invention. I have found, however, that in the case of esters of the anthracene-maleic acid adducts there is full compatibility with plastics in general in the case of esters formed from alcohols containing more than 1 up to at least 8 carbon atoms. In general, the higher the melting point of the ester the greater the rigidity of vinyl compounds plasticized with it.

When the esters are those of alcohols having 12 or more carbon atoms they may no longer be completely compatible with some of the commonly used synthetic organic polymers, but this and other similar esters containing longer alkyl chains may be used for the plasticizing of butyl rubber (copolymer of isobutylene and butadiene), polythenes (ethylene polymers), and the like polymeric materials in the form of long macromolecules. The octadecyl ester may be prepared as described by the following example.

*n-Octadecyl ester.*—55.2 gm. of crude Diels-Alder adduct of anthracene and 1,2 ethylene dicarboxylic anhydride and 108.2 gm. of n-octadecyl alcohol were heated with 2.8 gm. of p-toluene sulfonic acid at 130° to 150° C. for 6 hours. Water was removed as described in connection with the dibutyl ester. The product was taken up in 20 cc. of n-hexane, and the solution was cooled and filtered. Excess acid was neutralized by adding 22.5 cc. of 20 per cent sodium hydroxide solution, followed by repeated water washings. The solution was then refluxed 1 hour with 30 gm. of activated charcoal and 15 gm. of fuller's earth, after which it was filtered and the hexane then distilled off. The ester was a wax-like opaque pale brown solid having a hard glossy surface, and it melted at 40° C. and was soluble in toluol, xylol, hexane and n-butyl acetate, and was insoluble in alcohols and ketones. This ester is completely compatible with ethyl cellulose, polyethylene, butyl rubber, GR-S rubber, natural rubber, and nitro-cellulose. It is partly compatible with Lucite, Uformite, Vinylite VYNW and incompatible with Vinylite AYAF and Formvar.

Because of the relationship between maleic and fumaric acids, as well as others utilizable for the purposes of the invention, it will be understood that the esters formed from their anthracene adducts will exhibit cis-trans isomerism. Thus, each acid will produce Diels-Alder adduct of anthracene and 1,2 ethylene dicarboxylic acid, but it would be expected that the maleic and fumaric adducts would be, respectively, cis and trans forms of that acid as shown below for the dibutyl esters:

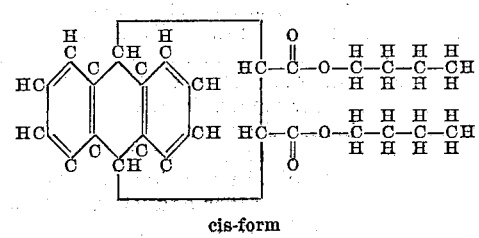

cis-form

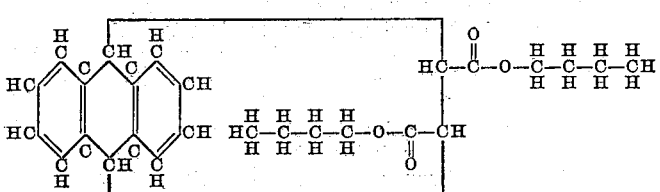

Likewise, the adduct made from maleic anhydride can exist in only one form but the possibility exists that a mixture of geometric isomers may result from the esterification reaction. In this connection, the following data on highly purified materials are of interest:

Ester A—Diels-Alder adduct of anthracene and maleic anhydride esterified with butyl alcohol. Ester M. P. 57.5°–59° C.
Ester B—from anthracene and dibutylmaleate. Ester M. P. 50°–51.5° C.
Ester C—anthracene-fumaric acid adduct esterified with butyl alcohol. Ester M. P. 50°–52° C. Ester C would be expected to be the transform.

A mixed melting point with ester B showed no change, indicating that the latter is the trans form also. However, mixed melting points of ester A with either ester B or ester C were about 47° C., indicating that ester A is the cis form, as would be expected. Whether or not there is actually cis-transisomerism where the possibility exists in the esters provided by this invention, the fact is that in the many esters prepared and tested any difference due to isomerism, or to the proportions of isomers present, has not detectably altered the physical properties to an extent where the plasticizing power of the esters, for instance as applied to synthetic organic polymeric substances has been impaired.

According to the provisions of the patent statutes, I have explained the principle and mode of practicing my invention and have described what I now consider to represent its best embodiment. However, I desire to have it understood that, within the scope of the appended claims, the invention may be practiced otherwise than as specifically described.

I claim:

1. As a new chemical compound, a non-resinous ester having the formula

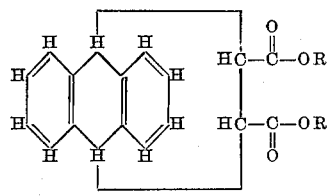

in which R is a member of the group consisting of an alkyl group containing at least two carbon atoms, a substituted alkyl group containing at least two carbon atoms, an aryl group, an alkaryl group, and an aralkyl group.

2. As a new chemical compound, a non-resinous ester of Diels-Alder adduct of anthracene and an ethylinically unsaturated carboxylic acid and an aliphatic monohydric alcohol containing at least two carbon atoms.

3. As a new chemical compound a non-resinous diester of Diels-Alder adduct of anthracene and an ethylenically unsaturated dicarboxylic acid and a monohydric aliphatic alcohol having more than one carbon atom.

4. As a new chemical compound, a non-resinous diester of Diels-Alder adduct of anthracene and maleic acid and an aliphatic monohydric alcohol having more than one carbon atom.

5. As a new chemical compound, a non-resinous diester of Diels-Alder adduct of anthracene and fumaric acid and an aliphatic monohydric alcohol having more than one carbon atom.

6. As a new chemical compound, non-resinous diethyl Diels-Alder adduct of anthracene and an acid of the group consisting of maleic and fumaric acids.

7. As a new chemical compound non-resinous dibutyl Diels-Alder adduct of anthracene and an acid of the group consisting of maleic and fumaric acids.

8. As a new chemical compound non-resinous di(2-ethyl hexyl) Diels-Alder adduct of anthracene and an acid of the group consisting of maleic and fumaric acids.

9. As a new chemical compound non-resinous dioctadecyl Diels-Alder adduct of anthracene and an acid of the group consisting of maleic and fumaric acids.

10. As a new chemical compound non-resinous dibenzyl Diels-Alder adduct of anthracene and an acid of the group consisting of maleic and fumaric acids.

11. As a new chemical compound, a non-resinous ester of Diels-Alder adduct of anthracene and crotonic acid and an aliphatic monohydric alcohol containing more than one carbon atom.

12. As a new chemical compound, a non-resinous ester of Diels-Alder adduct of anthracene and itaconic acid and an aliphatic monohydric alcohol containing more than one carbon atom.

13. As a new chemical compound, a non-resinous ester of Diels-Alder adduct of anthracene and an ethylenically unsaturated carboxylic acid and a saturated, primary, monohydric aliphatic alcohol containing more than one carbon atom.

14. As a new chemical compound, a non-resinous diester of Diels-Alder adduct of anthracene and maleic acid and a saturated, primary, aliphatic monohydric alcohol containing more than one carbon atom.

15. As a new chemical compound, a non-resinous diester of Diels-Alder adduct of anthracene and fumaric acid and a primary, saturated, aliphatic monohydric alcohol containing more than one carbon atom.

LYLE M. GEIGER.

REFERENCES CITED

The following references are of record in the file of this patent:

UNITED STATES PATENTS

| Number | Name | Date |
|---|---|---|
| 2,262,002 | Hopff | Nov. 11, 1941 |
| 2,311,261 | Staff | Feb. 16, 1943 |

OTHER REFERENCES

Diels et al., Annalen der Chem., vol. 486 (1931), pages 191–202.

Ardashev et al., Chem. Absts., vol. 34 (1940), page 5205.